United States Patent
Shmidt et al.

(10) Patent No.: US 9,483,305 B1
(45) Date of Patent: Nov. 1, 2016

(54) PARTIAL RESUME FOR OPERATING SYSTEM MODULES

(71) Applicant: Google Inc., Mountain View, CA (US)

(72) Inventors: Dmitry Shmidt, Mountain View, CA (US); Iliyan Batanov Malchev, Mountain View, CA (US); Dave Burke, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/721,747

(22) Filed: May 26, 2015

(51) Int. Cl.
*G06F 9/46* (2006.01)
*G06F 9/48* (2006.01)
*G06F 1/32* (2006.01)

(52) U.S. Cl.
CPC .............. *G06F 9/485* (2013.01); *G06F 1/3246* (2013.01); *G06F 1/3293* (2013.01)

(58) Field of Classification Search
None
See application file for complete search history.

(56) References Cited

U.S. PATENT DOCUMENTS

| | | | |
|---|---|---|---|
| 6,289,464 B1 * | 9/2001 | Wecker | G06F 1/1616 340/7.33 |
| 7,657,290 B2 | 2/2010 | Veselic et al. | |
| 8,335,935 B2 | 12/2012 | Thomas et al. | |
| 8,601,271 B2 | 12/2013 | Perez | |
| 8,677,158 B2 * | 3/2014 | Robben | G06F 1/3206 713/300 |
| 2006/0190357 A1 * | 8/2006 | Fuchs | G06F 9/4401 705/14.4 |
| 2007/0290281 A1 * | 12/2007 | Schluep | E05B 17/10 257/414 |
| 2009/0307520 A1 * | 12/2009 | Anselmi | G06F 1/14 713/600 |
| 2010/0184383 A1 * | 7/2010 | Lerke | H04R 25/552 455/66.1 |
| 2012/0102348 A1 | 4/2012 | Muralidhar et al. | |
| 2012/0169608 A1 * | 7/2012 | Forutanpour | G09G 3/342 345/173 |
| 2013/0159869 A1 * | 6/2013 | Faraji | G06Q 50/00 715/738 |
| 2013/0191193 A1 * | 7/2013 | Calman | G06Q 30/00 705/14.4 |
| 2013/0237254 A1 * | 9/2013 | Papakipos | G06Q 10/10 455/456.3 |
| 2015/0185815 A1 * | 7/2015 | DeBates | G06F 1/3209 713/320 |
| 2015/0277545 A1 * | 10/2015 | Flowers | G06F 1/3296 713/323 |

OTHER PUBLICATIONS

Android, "Wakelocks: Detect No-Sleep Issues in Android* Applications," https://software.intel.com/enus/ android/articles/ wakelocksdetectnosleepissuesinandroidapplications, Jun. 7, 2013, 9 pages.

(Continued)

*Primary Examiner* — Dong Kim
(74) *Attorney, Agent, or Firm* — McDonnell Boehnen Hulbert & Berghoff LLP

(57) ABSTRACT

A computing device may receive a data packet. The computing device may be operating a plurality of kernel-space software modules that are in a suspended state, and the computing device may also be operating a plurality of user-space software modules that are in the suspended state. It may be determined that the data packet is of a particular packet type. Data packets of the particular packet type may be consumed by any of a particular subset of the kernel-space software modules. While the user-space software modules remain in the suspended state, the computing device may further (i) transition at least some kernel-space software modules to a non-suspended state, (ii) consume, by a particular one of the non-suspended kernel-space software modules, the data packet, and (iii) transition the non-suspended kernel-space software modules to the suspended state.

17 Claims, 8 Drawing Sheets

(56) References Cited

OTHER PUBLICATIONS

Android Power Management, http://elinux.org/Android_Power_Management, last accessed Mar. 26, 2015, 6 pages.

WakeonLAN, Wikipedia, http://en.wikipedia.org/wiki/WakeonLAN, last accessed Mar. 26, 2015, 10 pages.

Wysocki, Rafael J., "Technical Background of the Android Suspend Blockers Controversy," Faculty of Physics, University of Warsaw / SUSE Labs, Novell Inc., Nov. 12, 2010, 18 pages.

* cited by examiner

PARTIAL RESUME FOR OPERATING SYSTEM MODULES

BACKGROUND

Many modern wireless computing devices (WCDs) operate primarily on battery power. Battery technology has improved over the years, increasing the power provided by batteries. But, the power demands of WCDs, their operating systems, and their applications has increased as well. Consequently, many WCD users find that they charge their WCDs at least once a day. In many situations, such frequent charging is inconvenient, or might not be possible. Thus, it is desirable to further reduce the power utilization of WCDs.

SUMMARY

Computing devices in general, including WCDs, typically include hardware modules and software modules. The hardware modules may include a processor, memory, a network interface, input and output modules (e.g., a screen, keypad, button, etc.), and various forms of digital logic and/or circuitry that allow these aspects to operate with one another.

The software modules may include applications and an operating system. The applications may be user-space software modules that have limited privileges. Examples of user-space software modules include web browsers, email clients, messaging clients, gaming applications, and so on.

The operating system of a computing device may contain a kernel that provides memory management, task scheduling, and interfaces for application input and output. Each of these operations may be implemented as a kernel-space software module. The operating system may also include one or more additional kernel-space software modules for communicating with particular hardware devices that are part of, or associated with, the computing device. These additional modules may be implemented as device drivers, and may include interfaces to memory, networking hardware (e.g., Wifi and/or Ethernet components), sound output hardware, and graphical displays. Some of the additional modules may be dedicated to non-hardware-specific functions, such as a networking stack, a virtual private network client or server, or a virtual storage device.

Due to the general goal of decreasing the amount of power that a computing device consumes, some or all of the user-space and kernel-space software modules may support suspended and non-suspended states. When a software module is suspended, it may use less power of the computing device than the software module would when in the non-suspended state. Consequently, it is desirable for both user-space and kernel-space software modules to be placed in the suspended state when they are not carrying out important operations. For a computing device in which some or all software modules are suspended, arrival of an input signal (e.g., a data packet) at the computing device may result in selected kernel-space software modules being resumed (placed in the non-suspended state) in order to determine how to route the input signal. If the input signal is not to be routed to a user-space software module, the user-space software modules may remain in the suspended state and one or more kernel-space software modules may be resumed to process the input signal. On the other hand, if the input signal is to be routed to a user-space software module, one or more kernel-space and user-space software modules may be resumed to process the input signal.

Regardless of the type of input signal, the computing device may carry out a partial resume operation, in which some, but possibly not all, kernel-space and/or user-space software modules are resumed. The particular software modules that are resumed may be based on the type of input signal received. By resuming fewer than all suspended software modules, the computing device might consume less power than if all suspended software modules were resumed.

Accordingly, a first example embodiment may involve a computing device receiving a data packet. The computing device may be operating a plurality of kernel-space software modules that are in a suspended state, and the computing device may also be operating a plurality of user-space software modules that are in the suspended state. The first example embodiment may also involve determining that the data packet is of a particular packet type. Data packets of the particular packet type may be consumed by any of a particular subset of the kernel-space software modules. The first example embodiment may further involve, while the user-space software modules remain in the suspended state, (i) transitioning at least some kernel-space software modules to a non-suspended state, (ii) a particular one of the non-suspended kernel-space software modules consuming the data packet, and (iii) transitioning the non-suspended kernel-space software modules to the suspended state.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as data storage and program instructions. The program instructions may be stored in the data storage, and upon execution by the at least one processor may cause the computing device to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
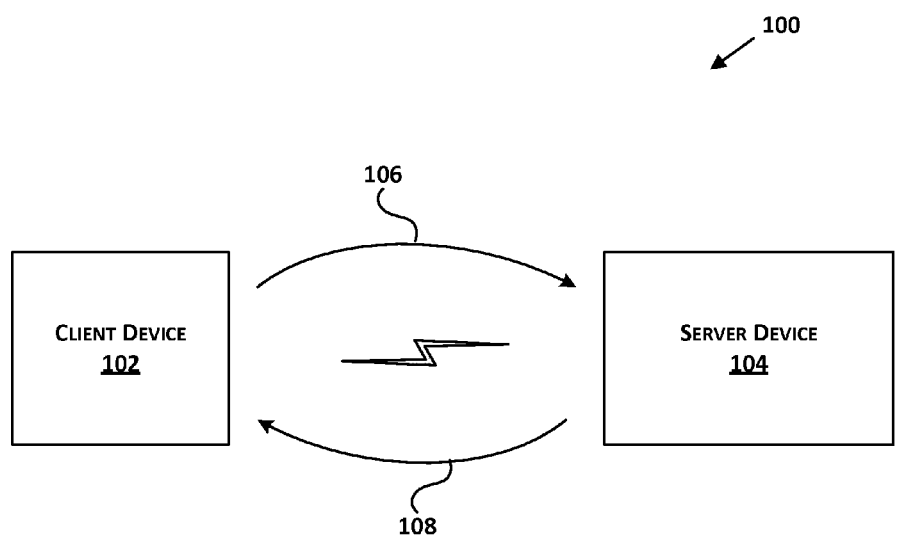
FIG. 1 depicts a client/server networked environment, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. OVERVIEW

Battery life remains a limitation of many WCDs. For instance, heavy use of a smartphone may drain a battery at such a rate that the smartphone needs to be charged more than once a day. This charging is an inconvenience to users, especially users who move about from place to place as part of their daily routines.

The processors of these WCDs, each of which may include multiple central processing unit (CPU) cores, are typically designed to enter a low-power mode when idle. In such a low-power mode, the CPUs may draw less voltage, and/or operate at a lower clock rate, than when in a high-power mode. Thus, when a CPU is not performing user-interface, networking, or background processing tasks, the CPU may use less power than it otherwise would. In general, the idle mode of a CPU may be thought of as when the WCD's operating system and applications installed on the WCD are not using the CPU, or using less than a threshold amount of the CPU's resources. For multiple-core CPUs, one or more cores may transition into idle mode independently from the other cores.

In order to allow CPUs to be in idle mode as much as reasonably possible, and therefore reduce the amount of battery power used by these CPUs, it is desirable for software modules operating on the WCD to be suspended when not in use. Suspended software modules use little or no CPU resources, thus reducing the overall power demands on the WCD and increasing the WCD's battery life.

As noted above, the operating system (e.g., the kernel) of the WCD may include kernel-space software modules that can be suspended. Similarly, user-space software modules can also be suspended. In some embodiments, all software modules can be suspended, while in other embodiments, only some software modules might be able to be suspended. Software modules may include machine-executable code and data. Further, one or more threads of execution (sometimes referred to as processes) may be associated with a software module. Suspension of a software module may refer to suspending, or freezing, its threads of execution, while resuming the software module may refer to un-suspending, or unfreezing, these threads of execution.

A WCD may frequently receive input signals that cause suspended software modules to be resumed. For instance, receiving input from a user, such as a command that turns on the WCD's screen or changes the volume of the WCD's speaker, may cause all software modules to be resumed. Similarly, receiving a data packet by way of a network interface may also cause all software modules to be resumed. These input signals also include timer-based events that can cause software modules to be resumed. For instance, the global positioning satellite (GPS) software on a WCD may be configured to resume every few minutes to determine the WCD's location. Other types of input signals are possible.

Resuming all software modules in response to these events may be wasteful, as only a subset of the WCD's software modules might be used to process the input signal. For instance, a particular type of data packet received by the WCD might pass through a relatively limited number of kernel-space software modules, before being consumed by one of these software modules. In such a situation, resuming all kernel-space and user-space software modules might not be necessary. Instead, only kernel-space software modules, such as the kernel-space software modules that process the particular type of data packet, might be resumed, and the remaining software modules may remain in the suspended state.

The embodiments herein provide example procedures, computing devices, and systems for implementing a partial resume of software modules. In doing so, the power requirements (and therefore the negative impact on battery life) of operating a computing device may be reduced.

In these embodiments, WCDs are used as an example of a computing device. Nonetheless, the embodiments herein are not limited to WCDs, and other types of computing devices may benefit from partial resume of software modules. For instance, even computing devices attached to a power source (e.g., plugged in) are likely to use less power, and therefore be less costly to operate, by implementing partial resume of software modules. The next section describes illustrative examples of such WCDs and systems.

2. EXAMPLE WCDS AND SYSTEMS

FIG. 1 illustrates an example communication system 100 for carrying out one or more of the embodiments described herein. Communication system 100 may include computing devices. Herein, a "computing device" may refer to either a client device (e.g., a WCD), a server device (e.g., a networked cluster of server equipment), or some other type of computational platform.

Client device 102 may be any type of device including a laptop computer, a wearable computing device, a WCD, a head-mountable computing device, a mobile telephone, or tablet computing device, etc., that is configured to transmit data 106 to and/or receive data 108 from a server device 104 in accordance with the embodiments described herein. For example, in FIG. 1, client device 102 may communicate with server device 104 via one or more wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a user interface, a communication interface, a main processor, and data storage (e.g., memory). The data storage may contain instructions executable by the main processor for carrying out one or more operations relating to the data sent to, or received from, server device 104. The user interface of client device 102 may include buttons, a touchscreen, a microphone, and/or any other elements for receiving inputs, as well as a speaker, one or more displays, and/or any other elements for communicating outputs.

Server device 104 may be any entity or computing device arranged to carry out server operations. Further, server device 104 may be configured to send data 108 to and/or receive data 106 from the client device 102.

Data 106 and data 108 may take various forms. For example, data 106 and 108 may represent data packets transmitted by client device 102 or server device 104 as part of a communication session. Such a communication session may include data packets transmitted on a signaling plane (e.g., session setup, management, and teardown messages), and/or data packets transmitted on a media plane (e.g., audio data).

Figure 2:
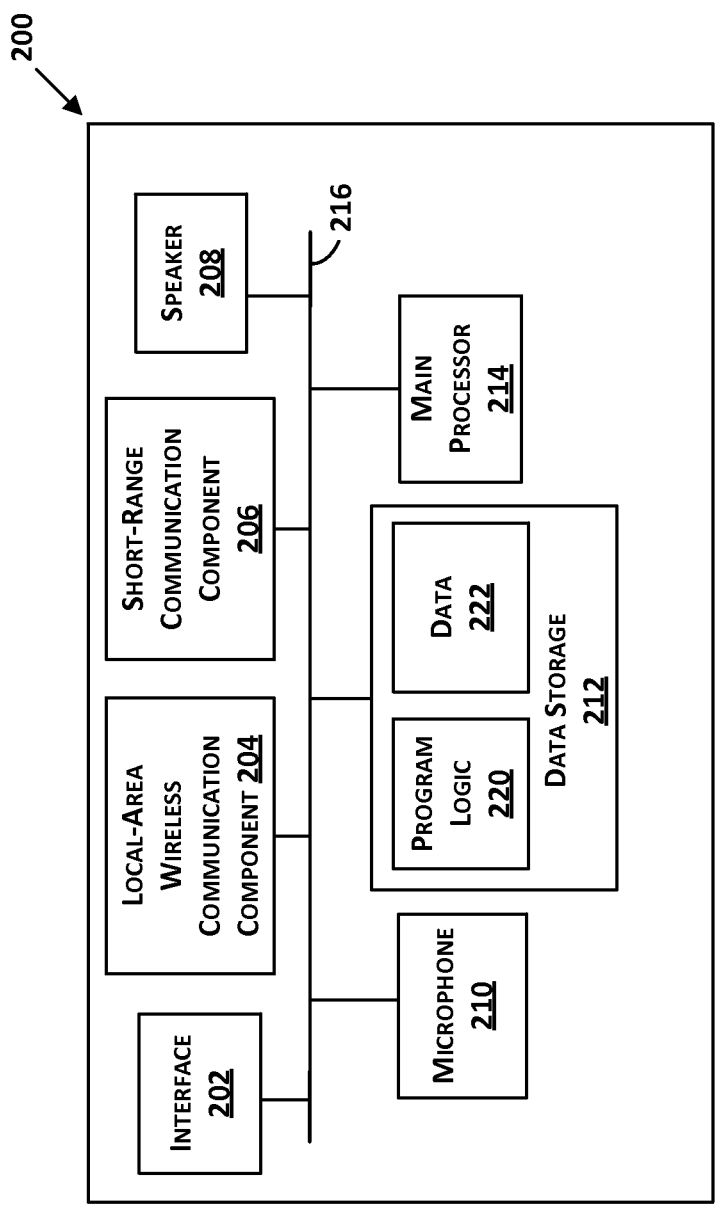
FIG. 2 depicts a schematic drawing of a WCD, according to example embodiments.

FIG. 2 illustrates a schematic drawing of an example WCD 200, where WCD 200 is an example embodiment of client device 102. Thus, WCD 200 may, for example, take the form of any client device described above in relation to FIG. 1. In some examples, components illustrated in FIG. 2 may be distributed across multiple client devices. Nonetheless, for illustrative purposes, components are shown and described in FIG. 2 as part of an example WCD 200.

In some implementations, WCD 200 may include a device platform or operating system (not shown). The device platform may include different applications and an application framework, as well as various kernels, schedulers, memory managers, libraries, and runtime entities. In some examples, other software modules may operate on WCD 200 as well.

WCD 200 may include an interface 202, a local area wireless communication component 204, a short-range communication component 206, a speaker 208, a microphone 210, data storage 212, and a main processor 214. Components illustrated in FIG. 2 may be linked together by a communication bus 216. WCD 200 may also include additional hardware to enable further functionality and/or operations.

Interface 202 may be configured to allow a user to interact with WCD 200. Thus, interface 202 may include user-interface components, such as a keyboard, touchscreen, touchpad, presence-sensitive input device, display, etc.

Local-area wireless communication component 204 may be a communication interface that is configured to facilitate wireless data communication according to one or more wireless communication standards or non-standard protocols. For example, local-area wireless communication component 204 may include a Wifi interface that is configured to facilitate wireless data communication according to one or 802.11 protocols. Other examples are possible.

Short range communication component 206 may be a communication interface that is configured to facilitate wireless data and/or voice communication according to one or more personal-area wireless communication standards or non-standard protocols. For example, short range communication component 206 may be configured to facilitate wireless data communication according to one or more Bluetooth protocols. Other examples are possible.

Speaker 208 may be any type of apparatus that can produce sound. In some cases, speaker 208 may convert digital representations of sounds (e.g., digitally encoded voice or music signals) into audible analog representations of the sounds. Speaker 208 may be integrated with WCD 200, or may exist as a removable module (e.g., headphones or an external speaker).

Microphone 210 may be any type of apparatus that can receive analog sound. In some cases, microphone 210 may convert analog representations of sounds into digital representations of these sounds. Like speaker 208, microphone 210 may exist as a removable module (e.g., an external microphone).

Data storage 212 may store program logic 220 that can be accessed and executed by main processor 214. Program logic 220 may include machine-readable instructions that, when executed by main processor 214, cause WCD 200 to carry out various operations and procedures. Data storage 212 may also store data 222 that may include data collected by any of interface 202, local-area wireless communication component 204, short range communication component 206, and/or microphone 210. Data storage 212 may store additional data as well. Data storage 212 may be a non-transitory computer-readable data medium, such as a hardware memory module.

Main processor 214 may be any type of one or more microprocessors or general-purpose processors. However, main processor 214 may be integrated with or include various types of co-processors, network processors, graphics processors, and/or digital logic. Main processor 214 may support multiple power modes, including a low-power mode and a high-power mode. Main processor 214 may use less power when in the low-power mode than when in the high-power mode.

Communication bus 216 is illustrated as a wired connection; however, wireless connections may also be used. For example, communication bus 216 may be a wired serial bus, such as a universal serial bus (USB), or a parallel bus. Alternatively or additionally, communication bus 216 may be a wireless connection using, e.g., short-range wireless radio technology, communication protocols described in IEEE 802.11 (including any IEEE 802.11 revisions), or cellular technology, among other possibilities.

3. EXAMPLE WCD PROTOCOL STACK

Figure 3A:
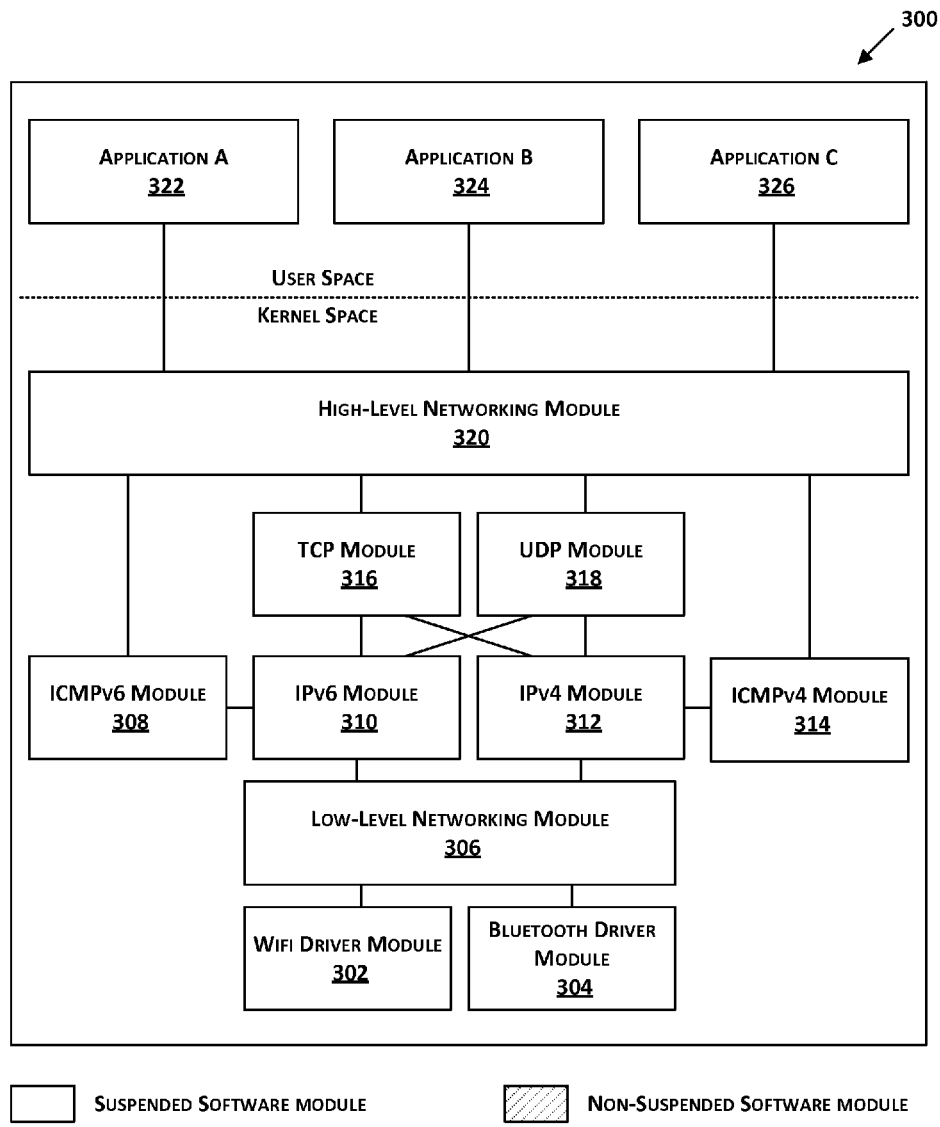
FIG. 3A depicts a suspended WCD network protocol stack, according to example embodiments.

FIG. 3A illustrates an example protocol stack of a WCD 300. WCD 300 may include some or all of the features discussed in the context of client device 102 and/or WCD 200. In kernel space, WCD 300 is operating a number of kernel-space software modules that make up the WCD's operating system. In user space, WCD is operating a number of user-space software modules (e.g., end-user applications). In full generality, WCD 300 may include more or fewer software modules. Particularly, the kernel space of WCD 300 may contain additional kernel-space software modules to carry out operating system functions or other functions, and the user space of WCD 300 may include additional user-space software modules to carry out application functions or other functions.

Wifi driver module 302 is a kernel-space software module that operates and/or controls one or more physical Wifi hardware components. In some embodiments, Wifi driver module 302 provides a software interface to Wifi hardware, enabling the operating system of WCD 300 to access Wifi hardware functions without needing to know precise control mechanisms of the Wifi hardware being used. When a data packet is transmitted or received by way of Wifi hardware, these packets may pass through, and/or are controlled by Wifi driver module 302.

Similarly, Bluetooth driver module 304 is a kernel-space software module that operates and/or controls one or more physical Bluetooth hardware components. In some embodiments, Bluetooth driver module 304 provides a software interface to Bluetooth hardware, enabling the operating system of WCD 300 to access Bluetooth hardware functions without needing to know precise control mechanisms of the Bluetooth hardware being used. When a data packet is transmitted or received by way of Bluetooth hardware, these packets may pass through, and/or are controlled by Bluetooth driver module 304.

WCD 300 may also include other driver modules not shown in FIG. 3A. For instance, Ethernet, cellular, and/or GPS driver modules may be incorporated into WCD 300. Further, either or both of Wifi driver module 302 and Bluetooth driver module 304 may be omitted.

Low-level networking module 306 routes inbound and outbound data packets between driver software modules and network layer software modules (e.g., IPv6 module 310 and IPv4 module 312). Thus, low-level networking module 306 may serve as a software bus or switching mechanism, and may possibly provide application programming interfaces between driver software modules and network layer software modules. For instance, low-level networking module 306 may include one or more queues in which inbound data packets are placed so that they can be routed to one of IPv6 module 310 and IPv4 module 312, and one or more queues in which outbound data packets can be placed so that they can be routed to one of Wifi driver module 302 and Bluetooth driver module 304. In some embodiments, low-layer networking module 306 might not be present as a separate kernel-space software module, and its functionality may instead be incorporated into driver software modules and/or network layer software modules.

IPv6 module 310 operates the Internet Protocol version 6 (IPv6) on behalf of WCD 300. IPv6 is a version of the Internet Protocol that features an expanded address space, device auto-configuration, a simplified header, integrated security and mobility support, and improved multicast capabilities. IPv6 module 310 encapsulates outbound data packets received from higher-layer modules (including those of ICMPv6 module 308, TCP module 316, and UDP module 318) in an IPv6 header. Conversely, IPv6 module 310 also decapsulates inbound IPv6 data packets received from low-layer networking module 306.

ICMPv6 module 308 operates the Internet Control Message Protocol version 6 (IPv6) on behalf of WCD 300. ICMPv6 provides support for error and informational messages related to IPv6. ICMPv6 also supports multicasting, as well as address resolution. For instance, ICMPv6 defines echo request and response (e.g., ping) messages, group membership messages for multicast support, router solicitation and advertisement messages for automatically configuring the IPv6 address of a device, and neighbor solicitation and advertisement messages for mapping the IPv6 address of a device to a medium access layer (MAC) address of one of the device's interfaces (e.g., a 48-bit Wifi address). Some IPv6 devices send neighbor solicitation and/or advertisement messages at frequent intervals, triggering additional processing on the devices that receive these messages.

IPv4 module 312 operates the Internet Protocol version 4 (IPv4) on behalf of WCD 300. IPv4 is a version of the Internet Protocol that features a smaller address space than IPv6. Similar to IPv6 module 310, IPv4 module 312 encapsulates outbound data packets received from high-layer modules (including those of ICMPv4 module 314, TCP module 316, and UDP module 318) in an IPv4 header. Conversely, IPv4 module 312 also decapsulates inbound data packets received from low-layer networking module 306.

ICMPv4 module 314 operates the Internet Control Message Protocol version 4 (IPv6) on behalf of WCD 300. ICMPv4 provides support for simple error reporting, diagnostics, and limited configuration for devices. For instance, like ICMPv6, ICMPv4 defines echo request and response (e.g., ping) messages, and router solicitation and advertisement messages. ICMPv4 also supports additional types of messages that report when a destination is unreachable, a packet has been redirected from one router to another, or a packet was discarded due to experiencing too many forwarding hops.

TCP module 316 operates the Transport Control Protocol (TCP). TCP is a reliable, end-to-end protocol that operates on the transport layer of a networking protocol stack. TCP is connection-oriented, in the sense that TCP connections are explicitly established and torn down. TCP includes mechanisms in which it can detect likely packet loss between a sender and recipient, and resend potentially lost packets. TCP is also a modified sliding window protocol, in that only a limited amount of data may be transmitted by the sender before the sender receives an acknowledgement for at least some of this data from the recipient, and the sender may operate a congestion control mechanism to avoid flooding an intermediate network with an excessive amount of data.

UDP module 318 operates the User Datagram Protocol (UDP). UDP is a connectionless, unreliable transport-layer protocol. Unlike TCP, UDP maintains little state regarding a UDP session, and does not guarantee delivery of application data contained in UDP packets.

High-level networking module 320 routes inbound and outbound data packets between (i) user-space software modules and (ii) network-layer or transport-layer software modules (e.g., ICMPv6 module 308, ICMPv4 module 314, TCP module 316, and UDP module 318). Thus, high-level networking module 320 may serve as a software bus or switching mechanism, and may possibly provide application programming interfaces between user-space software modules and transport layer software modules. For instance, high-level networking module 320 may include one or more queues in which inbound data packets are placed so that they can be routed to a user-space software module, and one or more queues in which outbound data packets can be placed so that they can be routed to one of ICMPv6 module 308, ICMPv4 module 314, TCP module 316, and UDP module 318. In some embodiments, high-level networking module 320 may be implemented as a TCP/IP socket interface, which provides well-defined function calls that user-space software modules can use to transmit and receive data packets.

As noted above, user-space programs, such as application A 322, application B 324, and application C 326, may operate in the user space of WCD 300. These applications may be, for example, email applications, social networking applications, messaging applications, gaming applications, or some other type of application. Through interfaces into the kernel space of WCD 300 (e.g., high-level networking module 320 and/or other interfaces), these applications may be able to carry out input and output operations.

In FIG. 3A, all of the software modules are unmarked, indicating that they are in a suspended state. As noted above, software modules in a suspended state may be in the process of executing, but their execution is frozen, or taking place in a limited fashion (e.g., at periodic intervals or at a slower pace). When an input signal, such as a data packet, arrives at WCD 300, the associated networking interface hardware (the Wifi, Bluetooth, Ethernet, or cellular interface, for instance) may receive the data packet and send a signal to resume some or all of the software modules on WCD 300.

In some implementations of a computing device, each time a data packet is received, all kernel-space and user-space software modules are resumed. Doing so has some advantages—it is guaranteed that the software modules that are to process the data packet, if they are executing, will be resumed. However, a disadvantage to this approach is that some data packets are served by only a few software modules. Therefore, resuming all software modules each time a data packet is received may be unnecessary, and may consume a significant amount of the WCD's power.

In other implementations of a computing device, less than all of the kernel-space and user-space software modules may be resumed when a data packet is received. For instance, certain types of data packets might be consumed by a particular kernel-space software module. When these types of data packets are received, there may be no need to resume user-space software modules.

After the resumed software modules have been in the non-suspended state for some period of time, the WCD's power management module may attempt to return at least some of these software modules to the suspended state. To that end, some or all software modules may include partial-resume handlers. These handlers may be callback functions that return an indication of whether a non-suspended (resumed) software module is ready to be suspended once again. If the power management module determines that some or all non-suspended software modules indicate that they are ready to be suspended, the WCD may suspend these software modules.

Figure 3B:
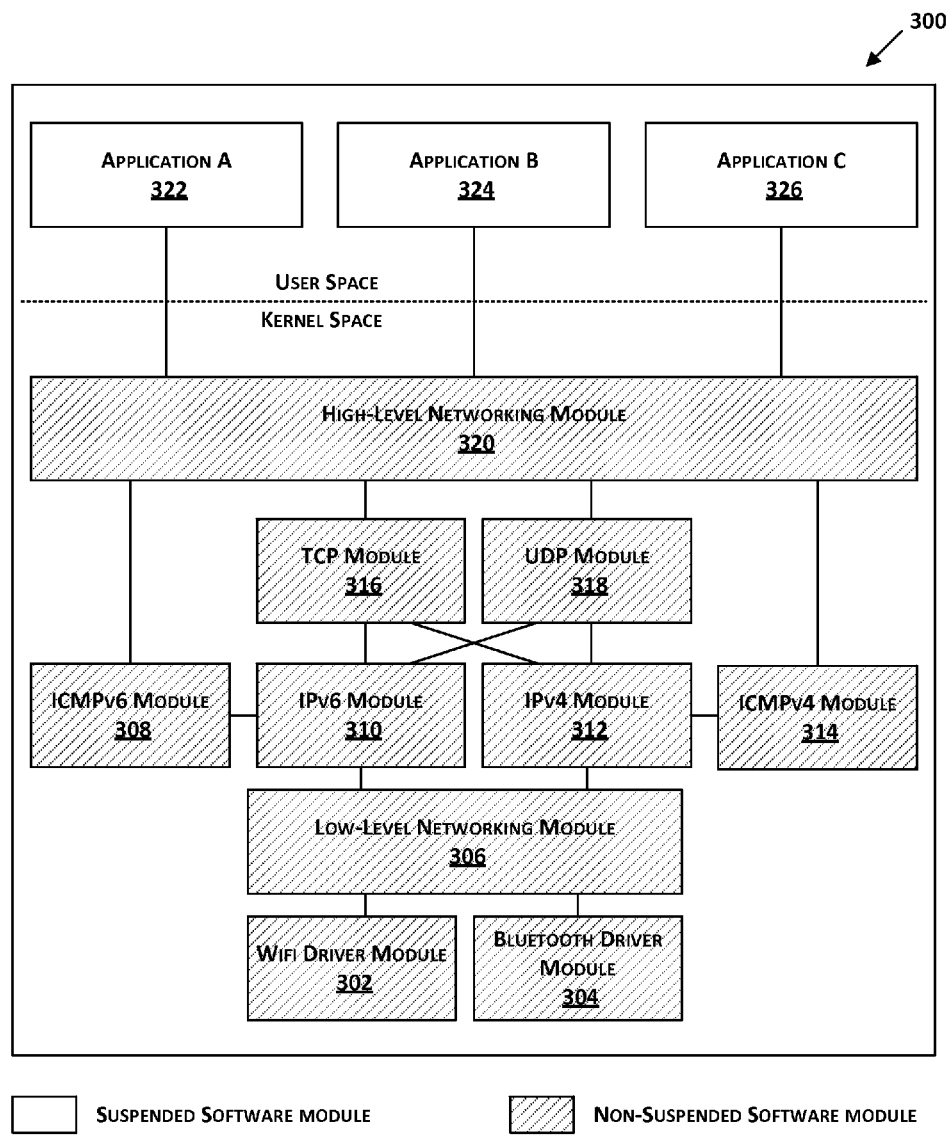
FIG. 3B depicts a partially resumed WCD network protocol stack, according to example embodiments.

FIG. 3B illustrates how WCD 300 could resume just kernel-space software modules upon receiving a particular type of data packet. For instance, the received data packet may be an ICMPv6 neighbor advertisement packet that was received by Wifi interface hardware. This type of packet is consumed by ICMPv6 module 308, and does not directly impact user-space software modules.

Thus, after an ICMPv6 neighbor advertisement packet is received, WCD 300 may resume all kernel-space software modules. Then, Wifi driver module 302 may read the packet from the Wifi interface hardware, and the packet may then pass through low-level networking module 306 to IPv6 module 310. IPv6 module 310 may deliver the packet to ICMPv6 module 308, which may process and consume the packet. In doing so, ICMPv6 module 308 may cause a state change in ICMPv6 module 308 and/or IPv6 module 310. For instance, ICMPv6 module 308 may update or create an entry in a neighbor cache. Such an entry may represent a mapping between a neighbor device's IPv6 address and the neighbor device's MAC address. This processing may take place without resumption of any user-space software modules.

Similar procedures may be used if other types of packets that are to be consumed by kernel-space software modules are received. For instance, any type of packet that is consumed by ICMPv6 module 308, ICMPv4 module 314, or another kernel-space software module (which may be included or not included in FIG. 3B) may be delivered to the appropriate kernel-space software module for consumption without resuming any user-space software modules.

After such a packet is processed, the WCD may allow the kernel-space software modules to continue executing for some time (e.g., a few seconds) before suspending these software modules once again. For instance, it may be beneficial to do so if the WCD receives additional input signals within this time period, as the partial resume process need not be carried out again in response to these input signals.

Figure 3C:
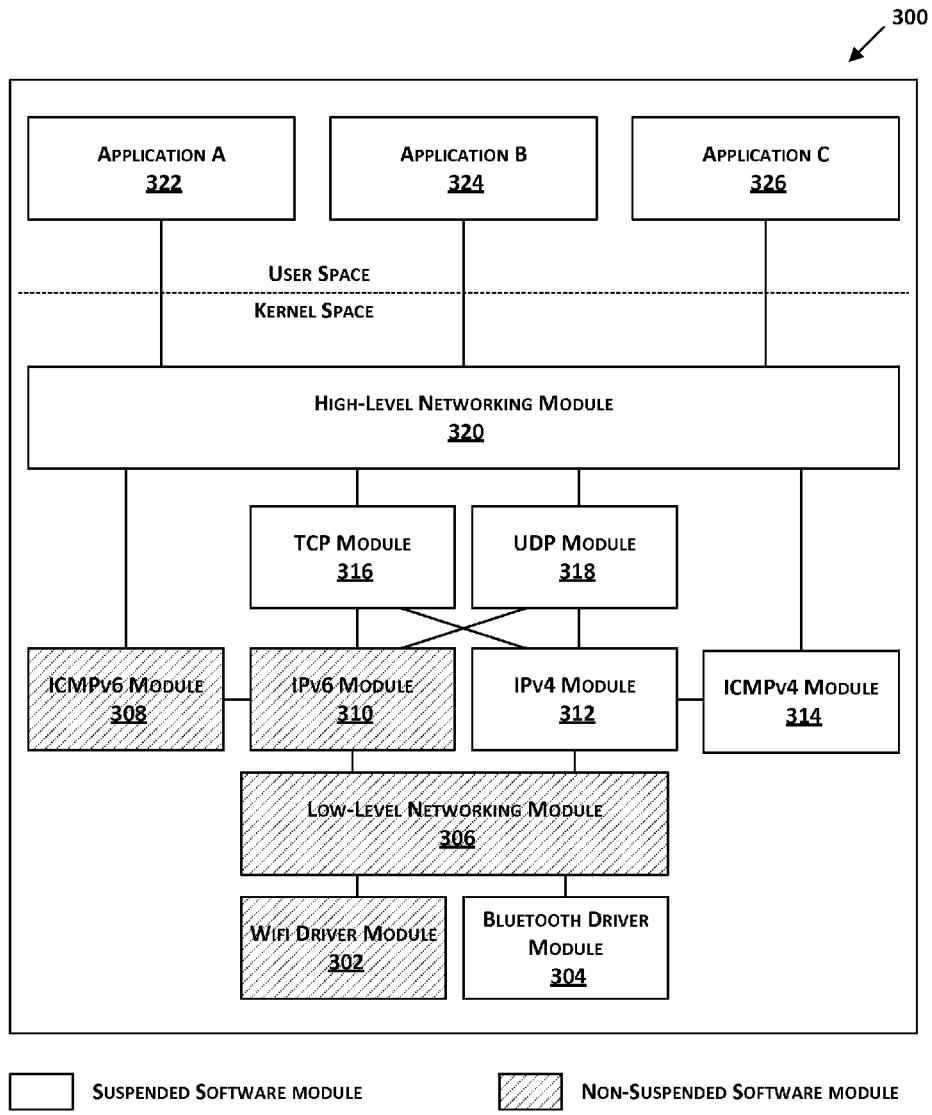
FIG. 3C depicts another partially resumed WCD network protocol stack, according to example embodiments.

In some cases, only the kernel-space software modules that process the data packet may be resumed. This variation of partial resumption is illustrated in FIG. 3C.

Similar to the example illustrated in FIG. 3B, an inbound data packet may be an ICMPv6 neighbor advertisement packet that was received by Wifi interface hardware. In response to receiving the ICMPv6 neighbor advertisement packet, WCD 300 may resume Wifi driver module 302 and low-level networking module 306.

The determination of which additional kernel-space software modules to resume may be based on the type of the packet. For instance, Wifi driver module 302 may read the packet from the Wifi interface hardware, and route the packet to low-level networking module 306. Based on the inbound data packet being an ICMPv6 neighbor advertisement packet, low-level networking module 306 may be configured to initiate the resumption of IPv6 module 310 and ICMPv6 module 308.

Low-level networking module 306 may then deliver the packet to IPv6 module 310. IPv6 module 310 may deliver the packet to ICMPv6 module 308, which may process and consume the packet. As noted above, ICMPv6 module 308 may update or create an entry in its neighbor cache. This processing, from the reception of the ICMPv6 neighbor advertisement packet to its consumption, may take place without resumption of any user-space software modules.

After such a packet is processed, WCD 300 may allow the non-suspended kernel-space software modules to continue executing for some time (e.g., a few seconds) before suspending these software modules once again. For instance, it may be beneficial to do so if WCD 300 receives additional ICMPv6 neighbor advertisement packets within this time period, as the partial resume process need not be carried out again in response to receiving these packets.

Figure 3D:
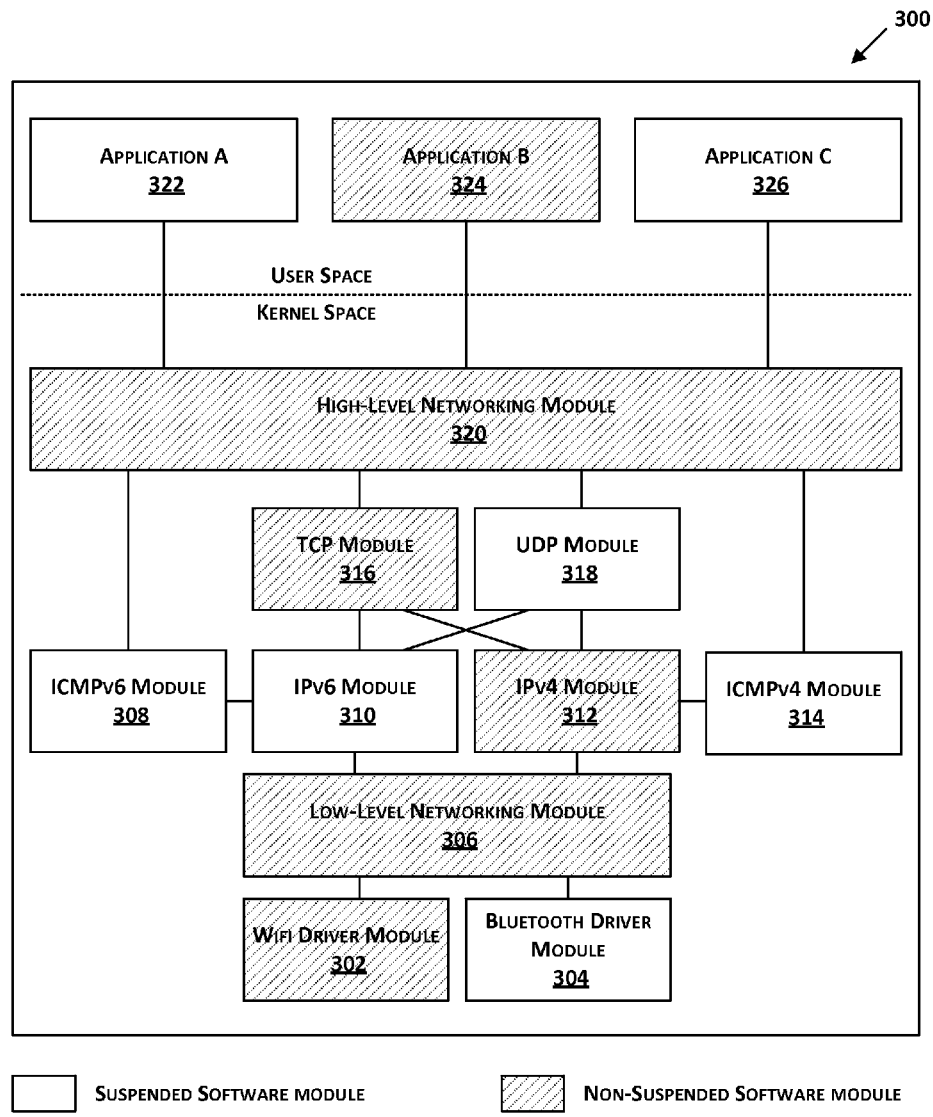
FIG. 3D depicts yet another partially resumed WCD network protocol stack, according to example embodiments.

For inbound data packets associated with a user-space software module, only the kernel-space and user-space software modules that process the data packet might be resumed. This variation of partial resumption is illustrated in FIG. 3D.

An inbound data packet may be received by Wifi interface hardware. The inbound data packet may be an IPv4/TCP packet that is to be consumed by application B 324. In response to receiving the packet, WCD 300 may resume Wifi driver module 302 and low-level networking module 306.

The determination of which additional kernel-space software modules to resume may be based on the type of the packet. For instance, as shown in FIG. 3D, Wifi driver module 302 may read the packet from the Wifi interface hardware, and route the packet to low-level networking module 306. Based on the packet being an IPv4/TCP packet, low-level networking module 306 may be configured to initiate the resumption of IPv4 module 312, TCP module 316, and high-level networking module 320.

Low-level networking module 306 may then deliver the packet to IPv4 module 312. IPv4 module 312 may deliver the packet to TCP module 316, and TCP module 316 may deliver the packet to high-level networking module 320. Each of these modules may process (e.g., decapsulate) the packet. The determination of which user-space software module(s) to resume may also be based on the type of the packet (e.g., the destination TCP port number or a socket identifier may be used for this purpose). Regardless, as shown in FIG. 3D, high-level networking module 320 may be configured to initiate the resumption of application B 324.

After such a packet is processed, the WCD may allow the non-suspended kernel-space and user-space software modules to continue executing for some time (e.g., a few seconds) before suspending these software modules once again. For instance, it may be beneficial to do so if the WCD receives additional inbound data packets for application B 324 within this time period, as the partial resume process need not be carried out again in response to receiving these packets.

4. EXAMPLE OPERATIONS

Figure 5:
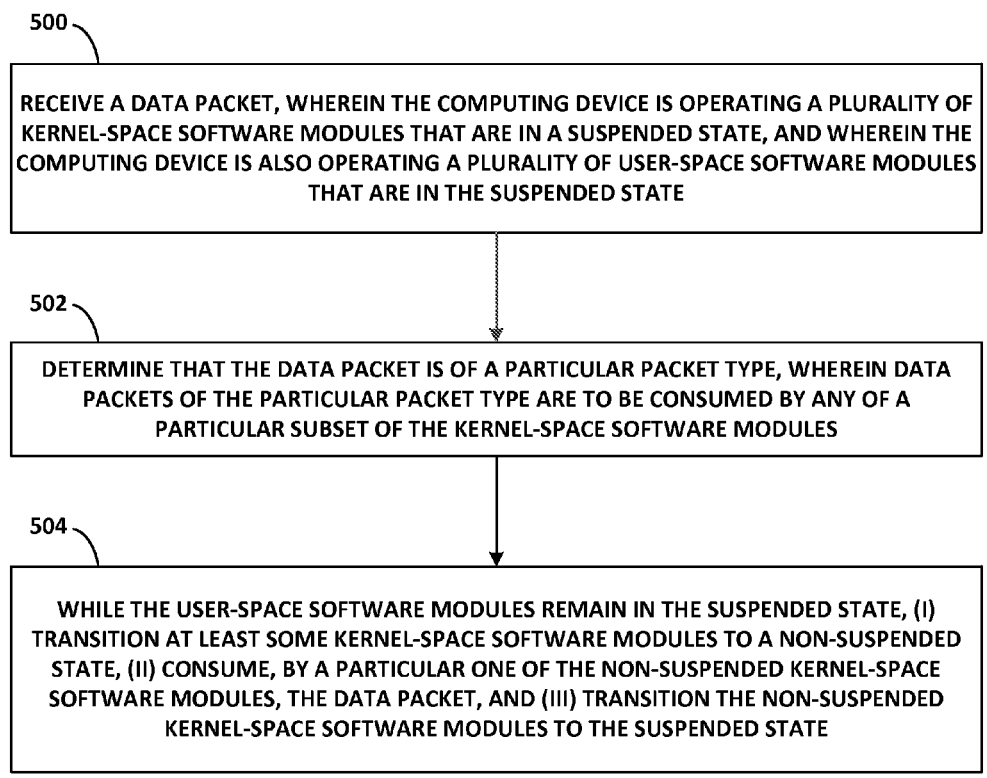
FIG. 5 is another flow chart, according to example embodiments.

FIGS. 5 and 6 are flow charts illustrating example embodiments. The embodiments illustrated by these figures may be carried out by a computing device, such as WCD 300. However, the embodiments can be carried out by other types of devices or device subsystems. Further, the embodiments may be combined, in part or in whole, and may incorporate any aspect or feature disclosed in this specification or the accompanying drawings.

Figure 4:
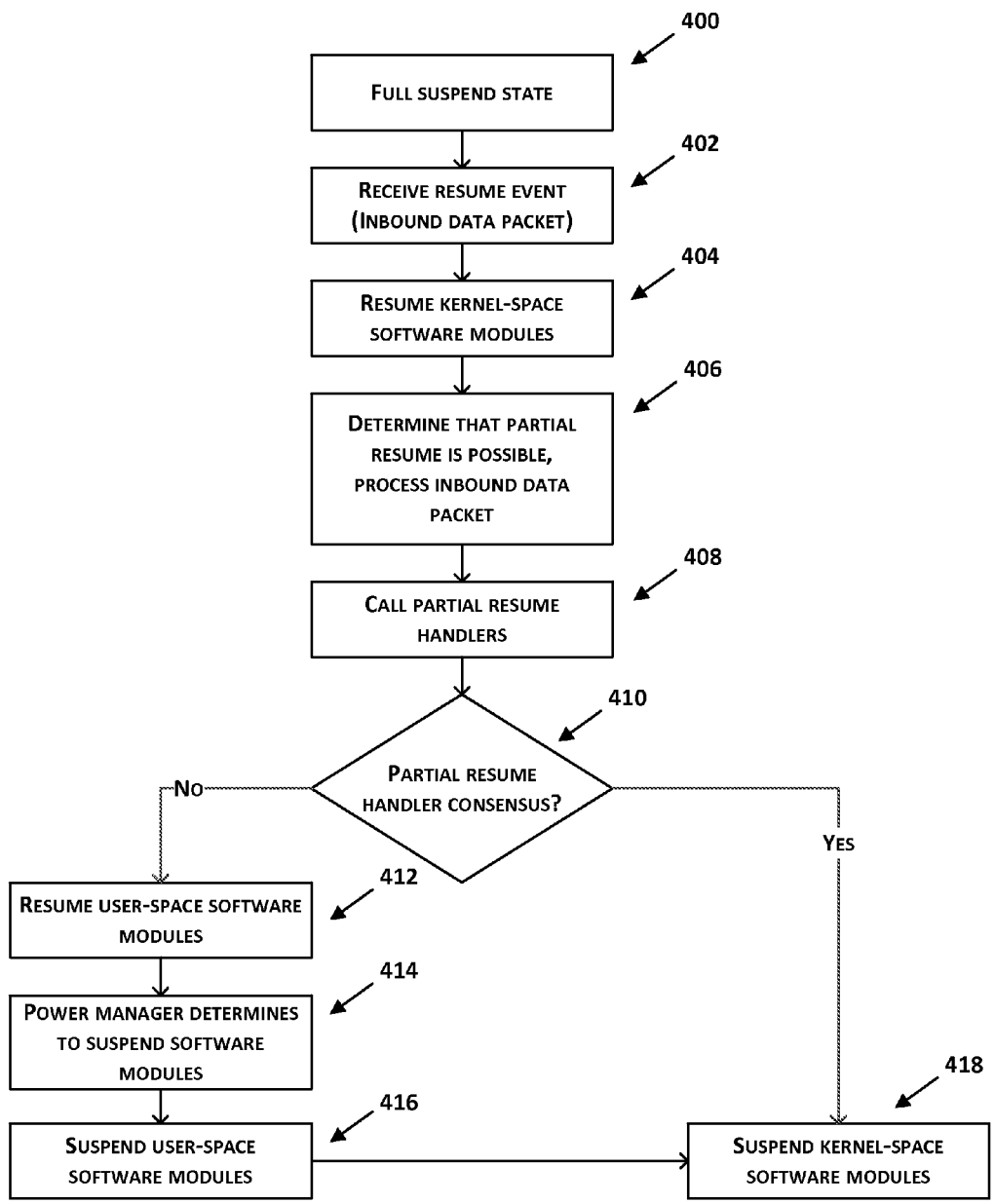
FIG. 4 depicts is partial resume flow chart, according to example embodiments.

Block 400 of FIG. 4 may involve a WCD being in a full suspend state. While in this state, most or all software modules are suspended. Block 402 may involve the WCD receiving a resume event (e.g., an input signal such as an inbound data packet). Block 404 may involve, possibly in response to receiving the resume event, resuming some or all kernel-space software modules of the WCD.

Block 406 may involve, perhaps based on the type of the packet, determining that partial resume is possible and processing the inbound data packet. At block 408, after the packet has been processed, the WCD may call the partial resume handlers of the resumed kernel-space software modules.

Block 410 may involve determining whether there is a consensus among the partial resume handlers. This consensus may involve all of the called partial resume handlers indicating that the associated kernel-space software modules have completed their tasks and are ready to be suspended. If so, then at block 418, the WCD suspends the kernel-space software modules.

Alternatively, there may be no consensus among the partial resume handlers (e.g., at least one associated kernel-space software module indicates that it or a user-space software module seek to carry out further processing). If so, at block 412, the WCD may resume the user-space software modules. Possibly after these user-space software modules have executed for some period of time, at block 414 the WCD's power management system may determine to suspend the user-space and kernel-space software modules. Then, at block 416, the WCD may suspend the user-space software modules. At block 418, the WCD may suspend the kernel-space software modules.

After suspending the kernel-space software modules at block 418, one or more processors of the WCD may enter a low-power state. While in this state, the WCD may use less power than the WCD would in a non-suspended state.

Block 500 of FIG. 5 may involve a computing device receiving a data packet. The computing device may be operating a plurality of kernel-space software modules that are in a suspended state. The kernel-space software modules may include kernel-space subsystems that are executed by kernel space threads of execution. The computing device may also be operating a plurality of user-space software modules that are in the suspended state.

Block 502 may involve determining that the data packet is of a particular packet type. Data packets of the particular packet type may be consumed by any of a particular subset of the kernel-space software modules. In some embodiments, the particular one of the kernel-space software modules is an ICMPv6 software module. Additionally, determining that the data packet is of the particular data type may involve determining that the data packet is an ICMPv6 neighbor advertisement packet.

Block 504 may involve, while the user-space software modules remain in the suspended state, (i) transitioning at least some kernel-space software modules to a non-suspended state, (ii) consuming, by a particular one of the non-suspended kernel-space software modules, the data packet, and (iii) transitioning the non-suspended kernel-space software modules to the suspended state. In some embodiments, software modules in the suspended state use less power of the computing device than software modules in the non-suspended state. Further, transitioning at least some kernel-space software modules to the non-suspended state may involve transitioning all of the kernel-space software modules to the non-suspended state.

At least one of the non-suspended kernel-space software modules may have pre-registered a callback function with the computing device. In this case, transitioning the non-suspended kernel-space software modules to the suspended state may involve calling each registered callback function, and determining, by way of the calls to the registered callback functions, that some or all of the associated non-suspended kernel-space software modules can be transitioned to the suspended state.

In some embodiments, the computing device may receive a second data packet. The second packet may be received before or after the first packet is received. At the time of receiving the second packet, the computing device may be operating a second plurality of kernel-space software modules that are in the suspended state. The computing device may also be operating a second plurality of user-space software modules that are in the suspended state. The computing device may further determine that the second data packet is to be consumed by a particular one of the second plurality of user-space software modules. Possibly in response to determining that the second data packet is to be consumed by the particular one of the second plurality of user-space software modules, the computing device may (i) transition at least some of the second plurality of kernel-space software modules to the non-suspended state, (ii) transition at least the particular one of the second plurality of user-space software modules to the non-suspended state, (iii) consume, by the particular one of the second plurality of user-space software modules, the data packet, and (iv) transition the non-suspended kernel-space software modules and user-space software modules to the suspended state.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, by a computing device, a data packet, wherein the computing device is operating a plurality of kernel-space software modules that are in a suspended state, and wherein the computing device is also operating a plurality of user-space software modules that are in the suspended state;
   determining that the data packet is of a particular packet type, wherein data packets of the particular packet type are to be consumed by any of a particular subset of the kernel-space software modules; and
   while the user-space software modules remain in the suspended state, (i) transitioning at least some kernel-space software modules to a non-suspended state, (ii) consuming, by a particular one of the non-suspended kernel-space software modules, the data packet, and (iii) transitioning the non-suspended kernel-space software modules to the suspended state, wherein a plurality of callback functions have been pre-registered with the computing device by one or more of the non-suspended kernel-space software modules, and wherein transitioning the non-suspended kernel-space software modules to the suspended state comprises calling each of the plurality of callback functions and determining, by way of the calls to the plurality of callback functions, that the associated non-suspended kernel-space software modules can be transitioned to the suspended state.

2. The method of claim 1, wherein software modules in the suspended state use less power of the computing device than software modules in the non-suspended state.

3. The method of claim 1, wherein transitioning at least some kernel-space software modules to the non-suspended state comprises transitioning all of the kernel-space software modules to the non-suspended state.

4. The method of claim 1, wherein the particular one of the kernel-space software modules is an Internet Control Message Protocol Version 6 (ICMPv6) software module.

5. The method of claim 4, wherein determining that the data packet is of the particular data type comprises determining that the data packet is an Internet Control Message Protocol Version 6 (ICMPv6) neighbor advertisement packet.

6. The method of claim 1, wherein the kernel-space software modules include kernel-space subsystems that are executed by kernel space threads of execution.

7. The method of claim 1, further comprising:
   receiving, by the computing device, a second data packet, wherein the computing device is operating a second plurality of kernel-space software modules that are in the suspended state, and wherein the computing device is also operating a second plurality of user-space software modules that are in the suspended state;

determining that the second data packet is to be consumed by a particular one of the second plurality of user-space software modules; and in response to determining that the second data packet is to be consumed by the particular one of the second plurality of user-space software modules, (i) transitioning at least some of the plurality of kernel-space software modules to the non-suspended state, (ii) transitioning at least the particular one of the second plurality of user-space software modules to the non-suspended state, (iii) consuming, by the particular one of the second plurality of user-space software modules, the data packet, and (iv) transitioning the non-suspended kernel-space software modules and user-space software modules to the suspended state.

8. An article of manufacture including a non-transitory computer-readable medium, having stored thereon program instructions that, upon execution by a computing device, cause the computing device to perform operations comprising:

receiving a data packet, wherein the computing device is operating a plurality of kernel-space software modules that are in a suspended state, and wherein the computing device is also operating a plurality of user-space software modules that are in the suspended state;

determining that the data packet is of a particular packet type, wherein data packets of the particular packet type are to be consumed by any of a particular subset of the kernel-space software modules; and while the user-space software modules remain in the suspended state, (i) transitioning at least some kernel-space software modules to a non-suspended state, (ii) consuming, by a particular one of the non-suspended kernel-space software modules, the data packet, and (iii) transitioning the non-suspended kernel-space software modules to the suspended state, wherein a plurality of callback functions have been pre-registered with the computing device by one or more of the non-suspended kernel-space software modules, and wherein transitioning the non-suspended kernel-space software modules to the suspended state comprises calling each of the plurality of callback functions and determining, by way of the calls to the plurality of callback functions, that the associated non-suspended kernel-space software modules can be transitioned to the suspended state.

9. The article of manufacture of claim 8, wherein software modules in the suspended state use less power of the computing device than software modules in the non-suspended state.

10. The article of manufacture of claim 8, wherein transitioning at least some kernel-space software modules to the non-suspended state comprises transitioning all of the kernel-space software modules to the non-suspended state.

11. The article of manufacture of claim 8, wherein the particular one of the kernel-space software modules is an Internet Control Message Protocol Version 6 (ICMPv6) software module.

12. The article of manufacture of claim 11, wherein determining that the data packet is of the particular data type comprises determining that the data packet is an Internet Control Message Protocol Version 6 (ICMPv6) neighbor advertisement packet.

13. A computing device comprising:

at least one processor;

memory; and program instructions, stored in the memory, that upon execution by the at least one processor cause the computing device to perform operations comprising:

receiving a data packet, wherein the computing device is operating a plurality of kernel-space software modules that are in a suspended state, and wherein the computing device is also operating a plurality of user-space software modules that are in the suspended state;

determining that the data packet is of a particular packet type, wherein data packets of the particular packet type are to be consumed by any of a particular subset of the kernel-space software modules; and while the user-space software modules remain in the suspended state, (i) transitioning at least some kernel-space software modules to a non-suspended state, (ii) consuming, by a particular one of the non-suspended kernel-space software modules, the data packet, and (iii) transitioning the non-suspended kernel-space software modules to the suspended state, wherein a plurality of callback functions have been pre-registered with the computing device by one or more of the non-suspended kernel-space software modules, and wherein transitioning the non-suspended kernel-space software modules to the suspended state comprises calling each of the plurality of callback functions and determining, by way of the calls to the plurality of callback functions, that the associated non-suspended kernel-space software modules can be transitioned to the suspended state.

14. The computing device of claim 13, wherein software modules in the suspended state use less power of the computing device than software modules in the non-suspended state.

15. The computing device of claim 13, wherein transitioning at least some kernel-space software modules to the non-suspended state comprises transitioning all of the kernel-space software modules to the non-suspended state.

16. The computing device of claim 13, wherein the particular one of the kernel-space software modules is an Internet Control Message Protocol Version 6 (ICMPv6) software module.

17. The computing device of claim 16, wherein determining that the data packet is of the particular data type comprises determining that the data packet is an Internet Control Message Protocol Version 6 (ICMPv6) neighbor advertisement packet.

\* \* \* \* \*